United States Patent
Madsen

(10) Patent No.: US 10,922,819 B2
(45) Date of Patent: Feb. 16, 2021

(54) METHOD AND APPARATUS FOR DETECTING DEVIATION FROM A MOTION PATTERN IN A VIDEO

(71) Applicant: CANON KABUSHIKI KAISHA, Tokyo (JP)

(72) Inventor: John Madsen, Regstrup (DK)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 16/209,624

(22) Filed: Dec. 4, 2018

(65) Prior Publication Data

US 2019/0188864 A1 Jun. 20, 2019

(30) Foreign Application Priority Data

Dec. 19, 2017 (GB) ..................................... 1721332

(51) Int. Cl.
*G06T 7/215* (2017.01)
*G06T 7/136* (2017.01)
(Continued)

(52) U.S. Cl.
CPC ............... *G06T 7/215* (2017.01); *G06K 9/00* (2013.01); *G06T 7/136* (2017.01); *G06T 7/254* (2017.01);
(Continued)

(58) Field of Classification Search
CPC . G06T 7/20; G06T 7/254; G06T 2207/20021; G06T 2207/20081;
(Continued)

(56) References Cited

U.S. PATENT DOCUMENTS 7,133,537 B1 * 11/2006 Reid .................... G06T 7/254
  382/103
7,236,527 B2 * 6/2007 Ohira ................... H04N 5/145
  348/E5.066

(Continued)

FOREIGN PATENT DOCUMENTS

EP        1631073 A2    3/2006
GB        2283385 A     5/1995
WO     2000/073996 A1   12/2000

OTHER PUBLICATIONS

Combined Search and Examination Report under Sections 17 and 18(3) for Application No. GB 1721332.3, dated Jun. 19, 2018.

*Primary Examiner* — Nizar N Sivji
(74) *Attorney, Agent, or Firm* — Canon U.S.A., Inc. IP Division

(57) ABSTRACT

A current motion grid comprising a plurality of elements is generated by storing in each element of the current motion grid an indication of whether there is a change between corresponding elements of at least two images captured from a video sequence. A current motion pattern grid comprising a plurality of elements is generated by firstly searching for a segment consisting of grid elements in which a change has been indicated in the current motion grid and which are neighbouring to one another and, secondly, storing in each element of the segment a value corresponding to a size of the segment. A value of an element of the current motion pattern grid is compared with a threshold value. It is then determined, based on the result of the comparison, whether there is deviation from the motion pattern.

21 Claims, 14 Drawing Sheets

(51) Int. Cl.
   *G06K 9/00* (2006.01)
   *G06T 7/254* (2017.01)
(52) U.S. Cl.
   CPC ............... *G06T 2207/10016* (2013.01); *G06T 2207/20021* (2013.01); *G06T 2207/20081* (2013.01); *G06T 2207/30232* (2013.01); *G06T 2207/30236* (2013.01)
(58) Field of Classification Search
   CPC . G06T 2207/30236; G06T 2207/10016; G06T 2207/30232; G06T 7/251; G06K 9/00; G06K 9/00771; H04N 7/18; H04N 5/144
   See application file for complete search history.

(56) References Cited

U.S. PATENT DOCUMENTS

| | | | |
|---|---|---|---|
| 8,320,458 B2* | 11/2012 | Sato | G06T 3/4007 375/240.12 |
| 8,508,599 B2* | 8/2013 | Miyasako | G06K 9/00261 348/208.1 |
| 9,641,838 B2* | 5/2017 | Takeda | H04N 19/463 |
| 10,425,582 B2* | 9/2019 | Kopf | G06T 5/50 |
| 2003/0219146 A1 | 11/2003 | Jepson et al. | |
| 2006/0045185 A1* | 3/2006 | Kiryati | G08B 13/19608 375/240.16 |
| 2008/0201116 A1* | 8/2008 | Ozdemir | G08B 21/0423 703/2 |
| 2011/0205359 A1* | 8/2011 | Lee | G06T 7/285 348/143 |
| 2012/0170802 A1* | 7/2012 | Millar | G06K 9/00785 382/103 |
| 2012/0229630 A1 | 9/2012 | Huang | |
| 2014/0072180 A1* | 3/2014 | Yamaguchi | G06T 7/254 382/107 |
| 2014/0254933 A1* | 9/2014 | Jin | G06T 7/238 382/173 |
| 2015/0222919 A1 | 8/2015 | Licata | |
| 2015/0281715 A1 | 10/2015 | Lawrence et al. | |
| 2016/0005281 A1 | 1/2016 | Laska et al. | |
| 2018/0227538 A1* | 8/2018 | Wang | G06K 9/00771 |

* cited by examiner

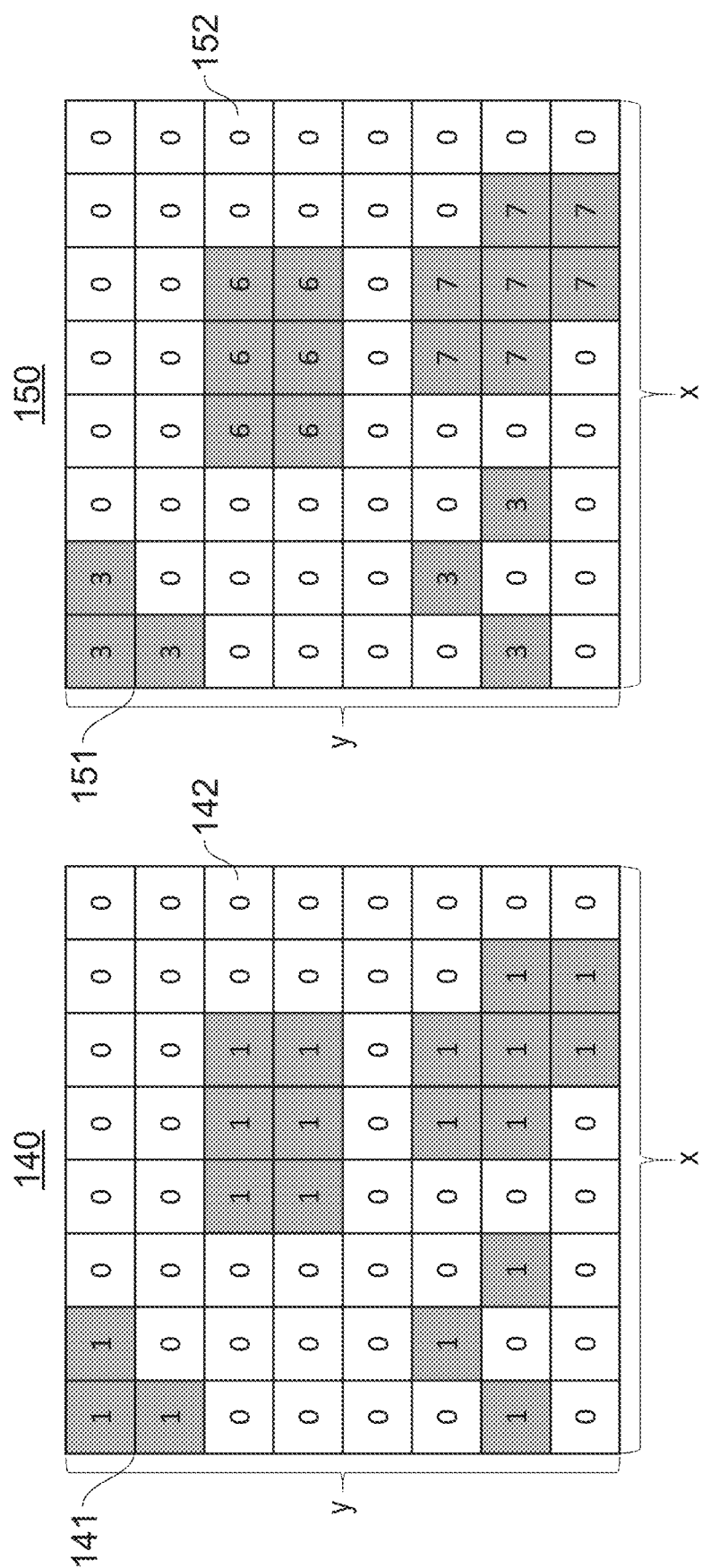
FIG. 1B (Motion grid)
FIG. 1C (Motion pattern grid)

METHOD AND APPARATUS FOR DETECTING DEVIATION FROM A MOTION PATTERN IN A VIDEO

CROSS-REFERENCE TO RELATED APPLICATION

The present patent application claims the benefit under 35 U.S.C. § 119(a)-(d) of United Kingdom Patent Application No. GB1721332.3, filed on Dec. 19, 2017 and entitled "METHOD AND APPARATUS FOR DETECTING DEVIATION FROM A MOTION PATTERN IN A VIDEO". The content of GB1721332.3 is incorporated herein by reference in its entirety.

TECHNICAL FIELD

The present invention relates to detecting motion deviation in a video. More particularly, and without limitation, the present invention relates to a method, an apparatus, a computer program and a computer-readable storage medium for detecting deviation from a motion pattern in a video scene using a grid based motion pattern model.

BACKGROUND

In video surveillance and monitoring technologies, motion detection is commonly used for determining when to record a video. The motion of an object is typically detected by motion detecting sensors such as passive infrared (PIR) sensors, sensors which use microwave or ultrasonic pulses, or vibration sensors. In imaging technology, algorithms are known for detecting motion in a continuous video stream. Some algorithms are based on comparing the current video frame to one from the previous frames. Some motion detection methods utilize image processing filters to find regions in which two video frames differ from each other.

However, most of the conventional image processing algorithms are computationally heavy and thus not applicable to big video surveillance setups because the hardware costs would be too high. Also, with the above conventional methods, it is not possible to distinguish between normal and abnormal motion.

Thus, there is a need in the art for detecting deviation from a motion pattern in a video scene, which provides optimized usage of computing and hardware resources.

SUMMARY OF THE INVENTION

The present invention provides a method, an apparatus, a computer program and a computer-readable storage medium for detecting deviation from a motion pattern in a video scene using a grid based motion pattern model.

According to a first aspect of the invention, there is provided a method for detecting deviation from a motion pattern in a video scene.

According to a second aspect of the invention, there is provided an apparatus for detecting deviation from a motion pattern in a video scene.

According to a third aspect of the invention, there is provided a computer-readable storage medium.

Motion pattern grid data has a very small size so that it requires much less storage space compared to video data. The motion pattern grid data can be stored as metadata separately in a database or together with the video data without requiring any significant extra disk space. Hence, the present invention optimizes the usage of computing and memory resources and thus reduces hardware costs.

An additional advantage is that traffic load due to transfer of motion pattern grid data, for example when retrieving recordings from remote recording servers, will remain small. Due to the small amount of data to be transferred, it does not occupy or require high network capacity. This is especially preferable since the available bandwidth between surveillance cameras and servers processing the data may often be limited and its use may be prioritised for other purposes during business hours.

A grid based motion pattern model may be generated from a live video sequence or a previously recorded video sequence. This is advantageous for example when there is not enough network capacity to transfer complete video recordings in a timely fashion. The deviation detection can be performed using the previously stored metadata, thus allowing for very fast forensic deviation detection. All computing operations may be performed on motion pattern grid data alone so they are computationally light weight.

Furthermore, the present invention allows extracting and comparing motion patterns using only motion pattern grid metadata. Thus, the amount of data to be analysed remains low in comparison to using conventional image processing algorithms. This reduces the required computing resources in systems implementing the invention.

Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

Embodiments will now be described, by way of example only, with reference to the accompanying drawings, in which:

FIG. 1B is a diagram illustrating a motion grid;

FIG. 1C is a diagram illustrating a motion pattern grid generated based on the motion grid of FIG. 1B;

DETAILED DESCRIPTION

Various illustrative embodiments, features, and aspects of the invention will be described in detail below with reference to the drawings. Configurations according to the illustrative embodiments of the present invention, which will be described below, are merely examples, and the present invention is not limited to these configurations.

Figure 1A:
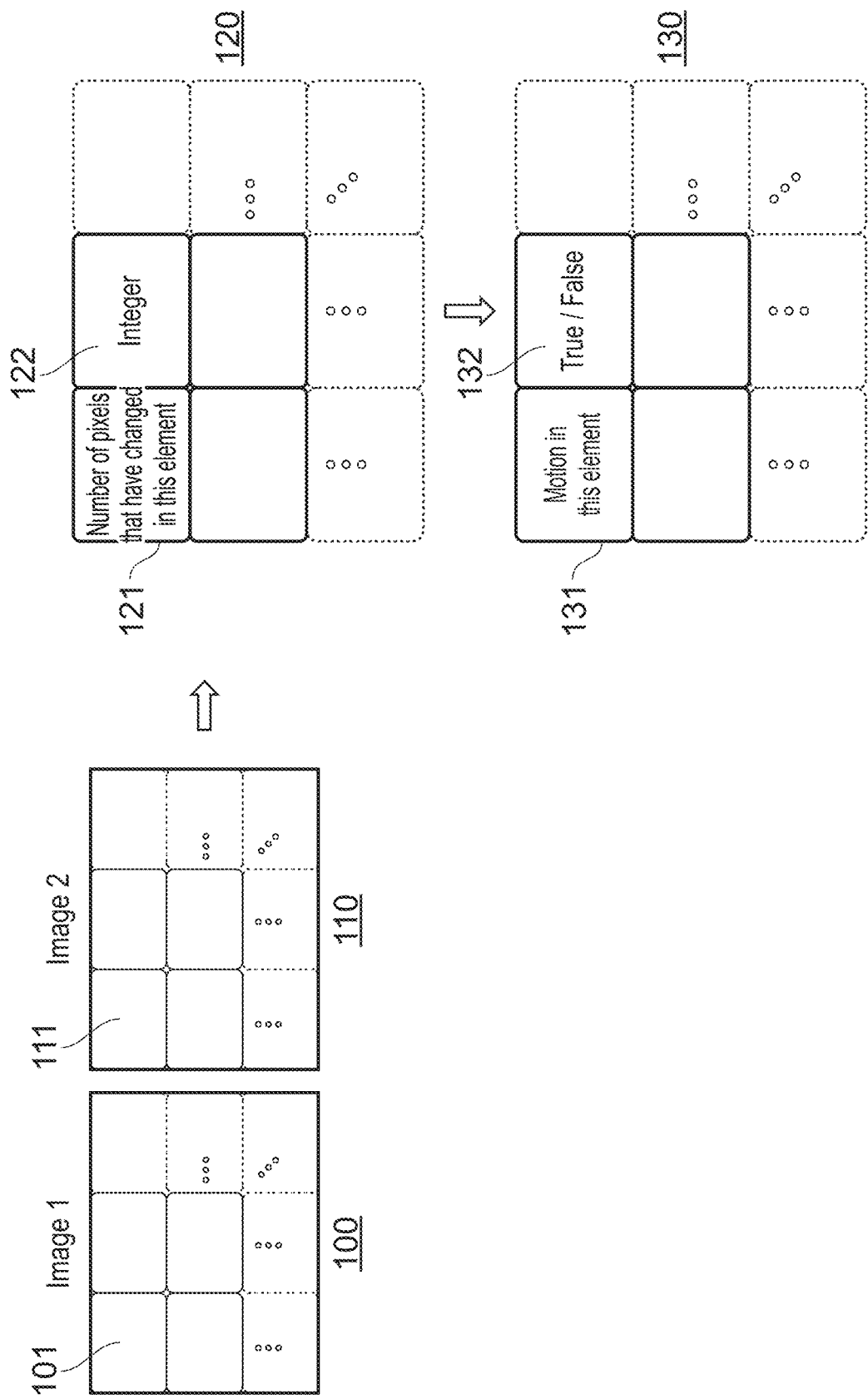
FIG. 1A is a diagram illustrating a method of generating a motion grid.

FIG. 1A illustrates a method of generating a motion grid according to some embodiments of the present invention. In FIG. 1A, at least two images or video frames, Image 1 (100) and Image 2 (110), are captured from a video sequence (not shown). The video sequence may be a live video sequence so that motion grids 120, 130 may be generated in real time. The video sequence may also have been recorded in advance and stored in a memory. The video sequence may comprise a certain, selected video scene of a surveillance video recorded by a surveillance camera.

Next, each of the at least two captured images 100, 110 is divided into a grid of a plurality of elements 101, 111 so that for each element of the grid of Image 1, there is a corresponding element on the grid of Image 2, having the same location and size. Each element of the grid includes at least one pixel. For example, the grid may be made up of 4×4 pixel squares.

Throughout this description, the term 'corresponding elements' refers to elements having the same location and size on different grids. The location may be defined for example by a row and a column on the grid.

Since the at least two images 100, 110 are captured at different temporal locations of the video, the image may be the same or it may have changed, if there is an object moving in the video which is captured into the image. The change can be detected by comparing the corresponding elements 101, 111 in the two images 100, 110, respectively, with each other. The change may be measured for example by counting the number of changed pixels in the corresponding elements. However, also other measurement methods may be used.

In the following, it is described how the motion grid 120, 130 is generated. First, it is determined how many pixels have changed (121) between the two captured images 100, 110 in each grid element. This information may be stored for example as an integer 122 in each element of the motion grid. The change between the two images may also be measured by other means.

Next, it is determined, based on the determined number of changed pixels in an element, whether there is a change in the element. A change would be an indication that there is motion in the video in that element. The determination may take into account a threshold value so that not all changes in the video are registered as motion. For example, it may be assumed that there is a certain amount of noise present in the image, which may be taken into account by means of a noise threshold.

If it is determined that there is a change in the element, that information is stored as an indication 131 in the corresponding element of the motion grid. The indication may be for example a 'true' (1) indication 132 if there is a change, or a 'false' (0) indication 132 if no change is detected. Again, a threshold may be taken into account so that the indication is marked as 'true' only if the level of the change (e.g., the number of changed pixels) exceeds a predetermined threshold. The initial value of the indication in each element of the motion grid 120, 130 may be 'false' (0). Thus, the motion grid 130 is generated by binarization of the motion grid 120 using a threshold value.

When generating the motion grid 120, 130, the whole frame of the captured images 100, 110 may be taken into account, or only a part of the frame of the images 100, 110 and the grids thereof may be considered based on for example an area of interest in the image.

The size of the motion grid 120, 130 corresponds to the size of the grid of the captured images 100, 110, or alternatively, to the size of the selected region in the captured images. The motion grids shown in FIG. 1A consist of a plurality of rectangle-formed elements, however also another form, such as a square form, may be used.

FIG. 1B shows an example of a motion grid. The motion grid 140 is an x by y grid (e.g. 8 by 8 as shown in FIG. 1B, but not limited thereto). Other possible sizes are for example 200 by 100 or 50 by 25. The motion grid 140 includes in each element a 'true' ('1') or 'false' ('0') indication of whether the element or at least one pixel has changed, optionally with some noise threshold, between two given image captures. In element 142, no change has been detected, as can be seen from the indication '0'.

The elements on the motion grid 140 in which a change has been marked or indicated and which are connected as neighbours form a segment 141. On the motion grid 140, two elements are neighbours if they are adjacent to each other either horizontally, vertically or diagonally. Hence, on the motion grid 140, there are four segments consisting of elements with a 'true' (1) indication.

FIG. 1C shows a motion pattern grid 150 generated based on the motion grid 140. As with the motion grid 140, a segment 151 in the motion pattern grid 150 consists of elements in which a change or motion has been marked or indicated and which are connected to one another as neighbours either horizontally, vertically or diagonally. A magnitude of each segment in the motion pattern grid 150 is defined based on the number of elements it contains. In other words, the magnitude of a segment corresponds to the size of the segment, measured by the number of elements it contains. For example, the magnitude of the segment 151 is three because it contains three neighbouring elements in which motion has been detected. The magnitude '3' of the segment 151 has been marked in each element of the segment 151, as can be seen in FIG. 1C. The magnitude of an element is the same as the magnitude of the segment it belongs to. The magnitude of an element 152 in which no motion or change has been detected is 0.

Figure 2A:
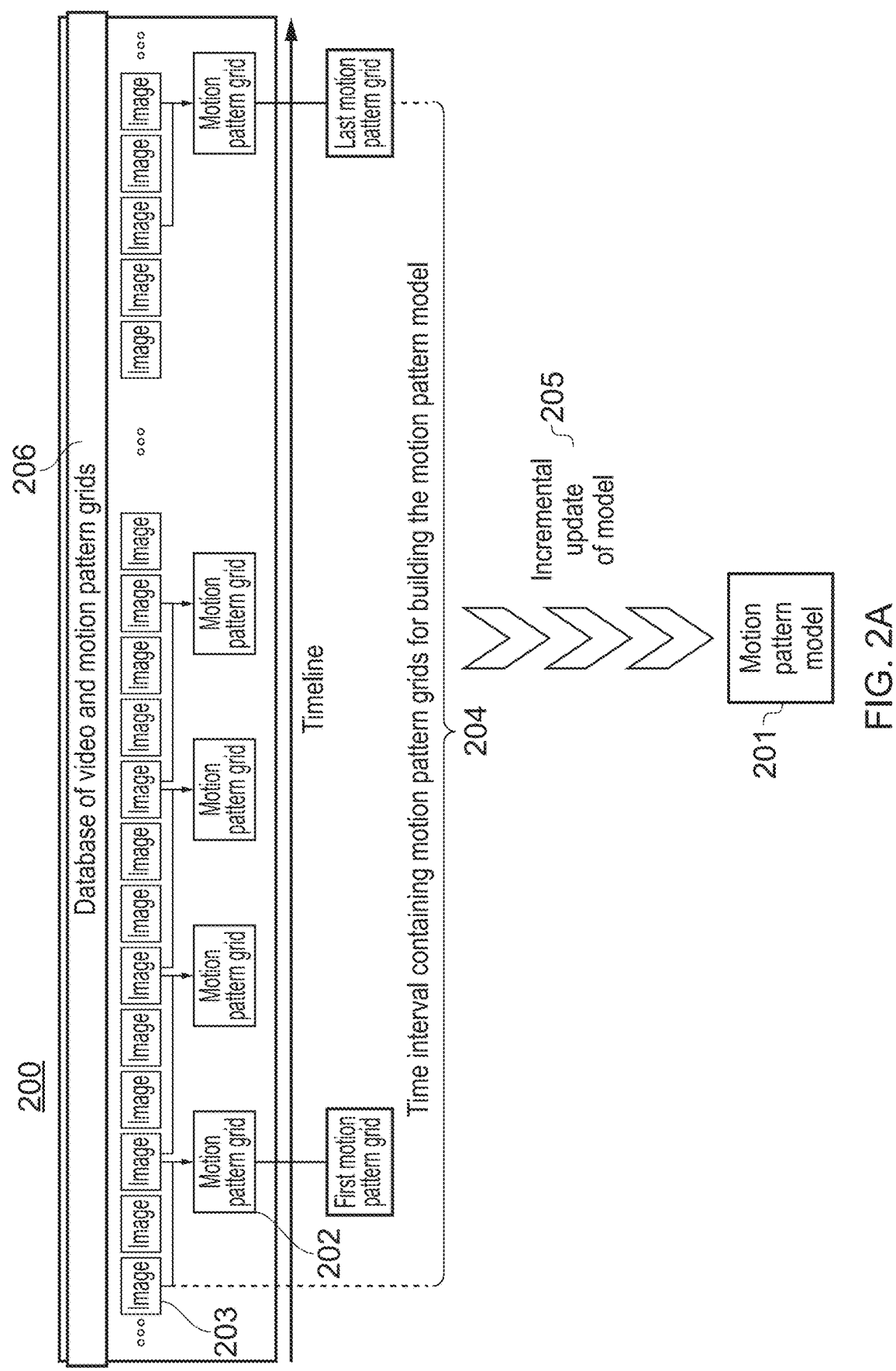
FIG. 2A is a diagram illustrating a method of generating a motion pattern model.

FIG. 2A is an illustration of a method 200 for generating a motion pattern model 201 according to some embodiments of the present invention. A series of motion pattern grids 202 is obtained based on the captured images 203 as described above. For example, a first captured image from a video sequence is compared to a second captured image from the same video sequence. For example, every third captured image can be used for building the motion pattern model, as shown in FIG. 2A. However, the sampling frequency of the video sequence is not limited by the present invention. The time between the first and the last sampled image in the video sequence defines a time interval 204 from which the series of motion pattern grids 202 is obtained. Hence, the series of motion pattern grids 202 comprises a number of motion pattern grids which are used to build the motion pattern model 201.

The time interval 204 may be selected so that it covers a selected scene in the video, which is of special interest. It can be for example a certain time of a day, such as from 4 pm until 6 pm, or generally daytime, or night time. The motion pattern model 201 may represent motion behaviour during the time interval and may be used for example to model traffic situations during a rush hour. Deviations from the motion pattern model 201 would then represent abnormal (or unexpected, unusual) motion. The time interval can also be related to a day of the week in order to have a model of normal motion behaviour on a specific day. It can be also a combination of the above, such as Friday, from 4 pm until 6 pm. Selecting a time frame aims at creating a model that represents normal motion expected in the monitored area of interest during the selected time.

The selected scene in the video may include video sequence for a specific place such as a house or property, a storage space, an outdoor area, a street or highway or an urban area to be monitored.

The motion pattern model 201 contains a grid having the same dimensions as those of the motion pattern grids 202. The information in the elements of the motion pattern grids 202 is incrementally accumulated. It means that in each element of the motion pattern model 201, an indication is stored which indicates the maximum magnitude or size of a segment detected in any of the corresponding elements of the series of the motion pattern grids 202. The motion pattern model 201 may be stored in a memory or a database 206.

The motion pattern model 201 may be updated over time by adding further motion pattern grids from the video sequence to the series of motion pattern grids 202. The motion pattern model 201 may also be updated by removing motion pattern grids from the series of motion pattern grids 202.

The series of motion pattern grids 202 may be obtained from a live video sequence. It may also be obtained from motion pattern grid data which has been generated in advance and stored for example in a database 206. Processing of the motion pattern grid data is light weight because it does not require processing of raw video data. There is also no need to process the data on-site where it has been recorded, but it can be transferred to a management site server where the processing takes place.

Figure 2B:
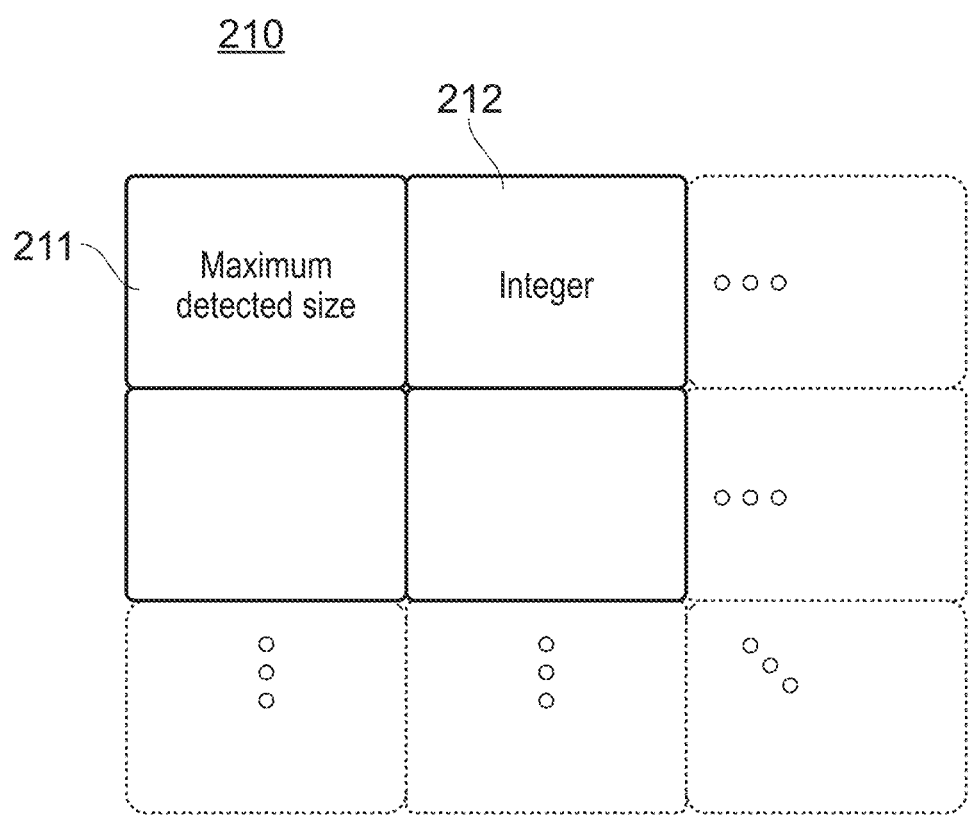
FIG. 2B is a diagram illustrating a motion pattern model.

FIG. 2B shows a motion pattern model 210 according to the present invention. The motion pattern model 210 has a grid format similar to the motion pattern grid of FIG. 1C. As described above, each element of the motion pattern model 210 contains an indication of the maximum magnitude that has been detected in any of the corresponding elements of the series of motion pattern grids 211. Based on the model it is possible to define for example the largest segments occurred in the scene. The size or magnitude of the segment may be an indication of the size of an object seen in the video, or it may indicate the distance of the object to the video camera. Storing information in each corresponding element about the size or magnitude of the related segment provides a basis for estimating the maximum size of the moving object in a certain location on the motion pattern grid.

In an alternative implementation, each element of the motion pattern model 210 may store one or more threshold values or a range of values. The range of values may include for example values which represent normal motion in the elements in question. In some embodiments, the range can also include values which represent abnormal motion. The threshold values may be defined for example based on the highest or lowest detected magnitude in corresponding elements in the series of motion pattern grids. Thus, the motion pattern model can be used for representing expected motion with respect to size, shape or distance of the object in the video scene.

Figure 3:
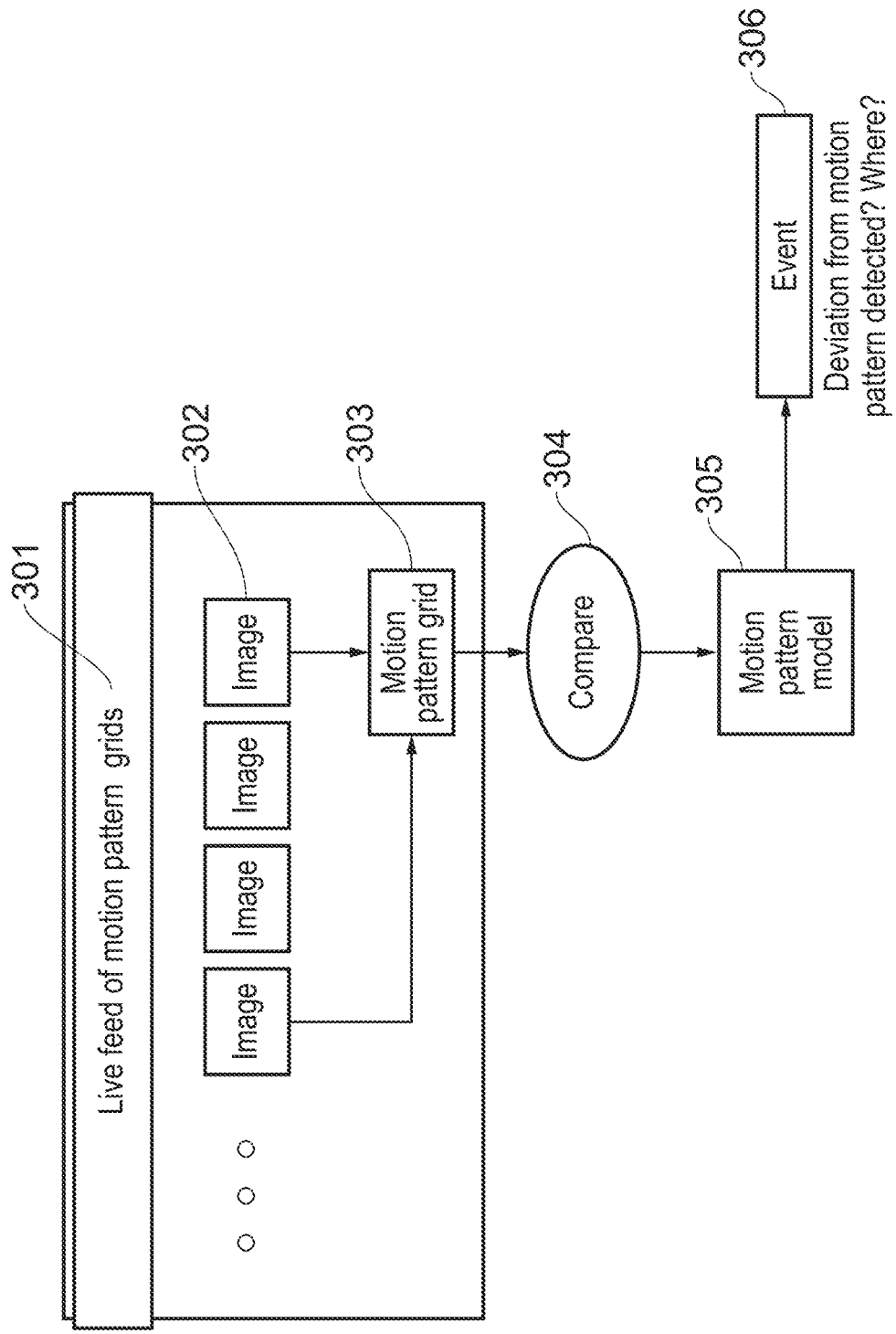
FIG. 3 is a diagram illustrating a method of detecting deviation from a motion pattern in a video scene, and triggering an event if deviation is detected.

FIG. 3 illustrates a method for detecting motion deviation in a video scene according to some embodiments. First, a current motion pattern grid 303 is generated from a live video feed 301 comprising a sequence of images 302 as described above. The video may also be a pre-recorded video instead of a live video. The temporal location of the current motion pattern grid 303 is after the time interval of the motion pattern model 305. The motion pattern model 305 is generated using the method described earlier. The current motion pattern grid 303 obtained from the live feed 301 and the motion pattern model 305 relate to the same scene of the video, for example, to the same target, e.g. a room that is being monitored, or a part of a highway where traffic situation is observed.

Next, the current motion pattern grid 303 obtained from a specific scene in the video is compared 304 to the motion pattern model 305 which is generated based on history data of the specific scene in the video. The comparison 304 may include comparing values stored in elements in a region of the current motion pattern grid 303 to values stored in corresponding elements in the corresponding region of the motion pattern model 305. Alternatively, the values of the elements in the region of the current motion pattern grid 303 can be compared to a predetermined threshold. The region may comprise any number of grid elements.

If, based on the comparison, the value of an element in the selected region of the current motion pattern grid 303 exceeds a predetermined threshold or the value of the corresponding element in the corresponding region of the motion pattern model 305, it is determined that there is deviation from the motion pattern. The occurrence of deviation may also be determined by measuring the difference to the threshold and checking whether the difference to the threshold exceeds a predetermined value. If the difference is greater than the predetermined value, it may be an indication that there is an unexpected object or abnormal motion in the video.

Alternatively, if the value of an element in the selected region of the current motion pattern grid 303 is lower than a predetermined threshold or the value of the corresponding element in the corresponding region of the motion pattern model 305, it is likewise determined that there is deviation from the motion pattern. The occurrence of deviation may also be determined by measuring the difference to the threshold and checking whether the difference to the threshold is smaller than a predetermined value. That may be an indication that an object in the video is getting smaller or that its distance from the video camera is getting larger.

Further, a range of values of an element may be used for representing either normal or abnormal motion behaviour in the video, as described above. For example, the range may be defined by a lower and a higher threshold value for an element. Values of the current motion pattern grid 303 which are within the range defined by those threshold values shall then be considered as an indication of either normal or abnormal motion behaviour. Correspondingly, values of the current motion pattern grid 303 falling outside the range shall be considered as either abnormal or normal motion behaviour, respectively. The range of values can be included in the elements of the motion pattern model.

It is noted that it is not necessary to use the complete area of the past motion pattern grids to build the motion pattern model 305, but it is also possible to extract a region of the motion pattern grids and use that instead. Similarly, it is not necessary to use the whole area of the frames of the images 302, but only a specific region of the images can be selected. The motion pattern model 305 and the current motion pattern grid 303 can be compared with each other as long as they cover the same area of the video images and have the same dimensions.

As a result of determining that there is deviation from the motion pattern, an event 306 may be triggered. In some embodiments, triggering the event 306 may take into account a predetermined threshold so that the event is triggered only if the number of deviating elements in a region exceeds the threshold.

The triggering of the event 306 may comprise at least one of setting a flag, setting a bit value to 1, raising an alert and outputting a notification. The notification may be sent to a user to notify him that deviation from the motion pattern is detected. Triggering the event 306 may also comprise outputting information of the location and/or number and/or identification information of the elements on the current motion pattern grid 303, in which potentially abnormal motion is detected. Hence the trigger can be used to inform the user, where the deviation has been detected. In addition, the moment at which the deviation occurs in the video may be output. The output information may include also other information about the deviation. The deviation information may be stored in a memory or database for later analysis.

Figure 4:
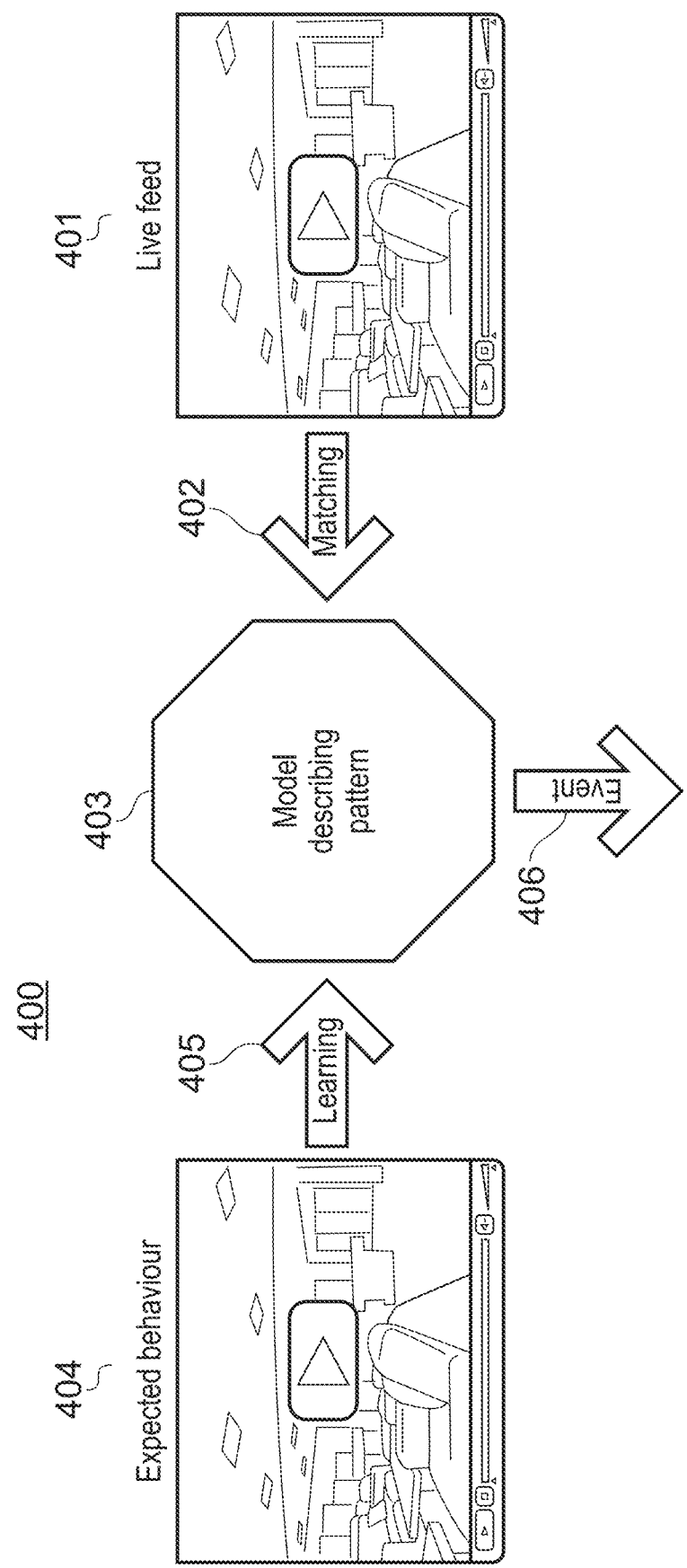
FIG. 4 is a diagram illustrating a method of updating the motion pattern model.

FIG. 4 shows a flowchart of a method 400 for updating a motion pattern model 403 according to what is considered as expected motion behaviour 404. In the method 400, live video feed 401 is matched 402 to the motion pattern model 403. This may include comparison of a current motion pattern grid to the motion pattern model as described above. In a normal case, if the current motion pattern grid obtained from the live video feed differs from the expected motion behaviour 404, it may trigger an event 406. Depending on the triggered event, it may cause for example sending an automatic notification to a user or outputting an alarm by the system.

In some cases, however, the motion pattern model 403 may be updated to include also the motion pattern grids in which deviation from the expected motion behaviour occurs. This way, such deviations will not trigger an event in future. The decision of which deviations are included in the motion pattern model 403 as expected behaviour 404 may be made by a user for example after noticing that a false alarm has been triggered. The motion pattern model can "learn" 405 from the made decisions and include similar deviations in future automatically in the model of expected motion behaviour.

Figure 5A:
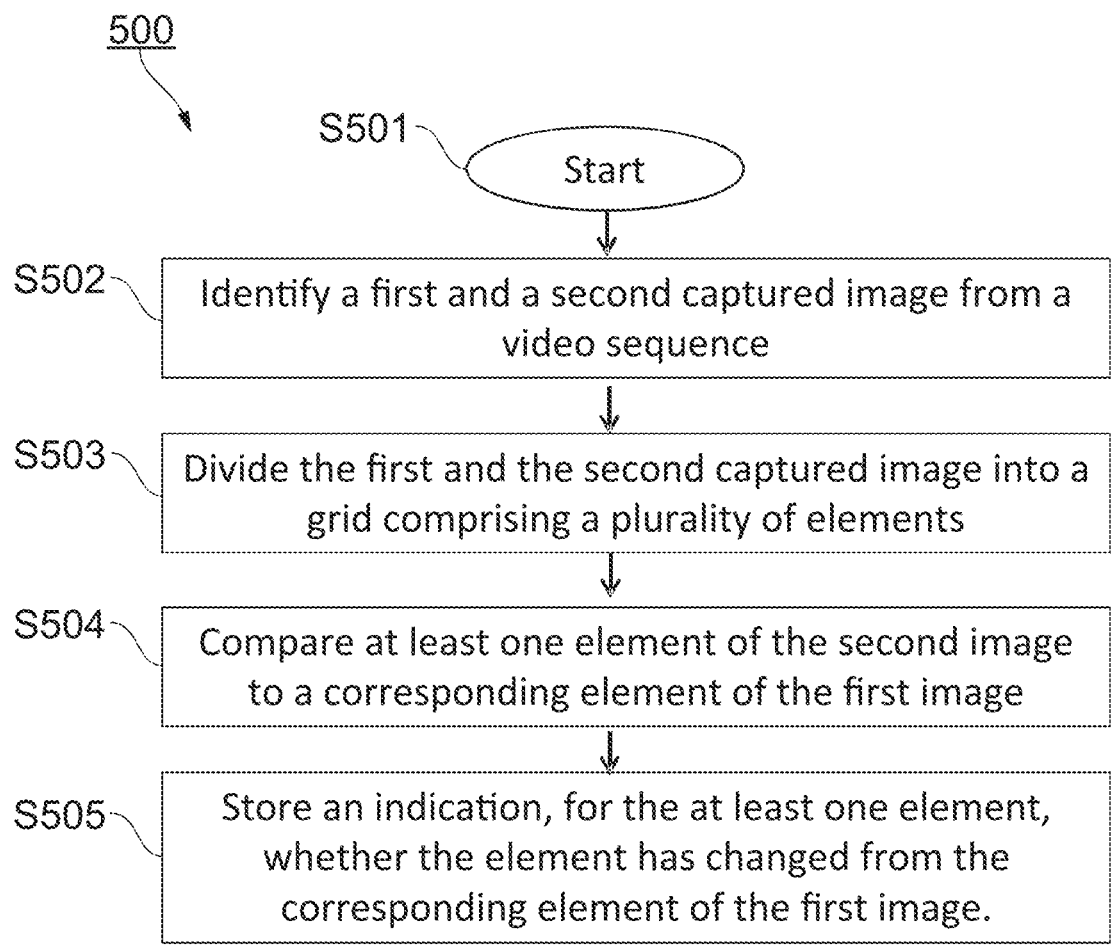
FIG. 5A is a flowchart illustrating a method for generating a motion grid.

With reference to the flowchart in FIG. 5A, a method 500 for generating a current motion grid 130, 140 is described. The method starts at step S501. At step S502, a first and a second captured image are identified from a video sequence. It is to be noted that the terms "first" and "second" are used for clarity purposes only. There is no limitation with respect to the temporal location of the two images in the video sequence. The video sequence can be in various video formats.

At step S503, the first and the second captured image are divided into a grid comprising a plurality of elements. Then, at step S504, at least one element of the second image is compared to a corresponding element of the first image. At step S505, an indication is stored in an element of the motion grid 130, 140, whether the at least element of the second image has changed from the corresponding element of the first image.

Figure 5B:
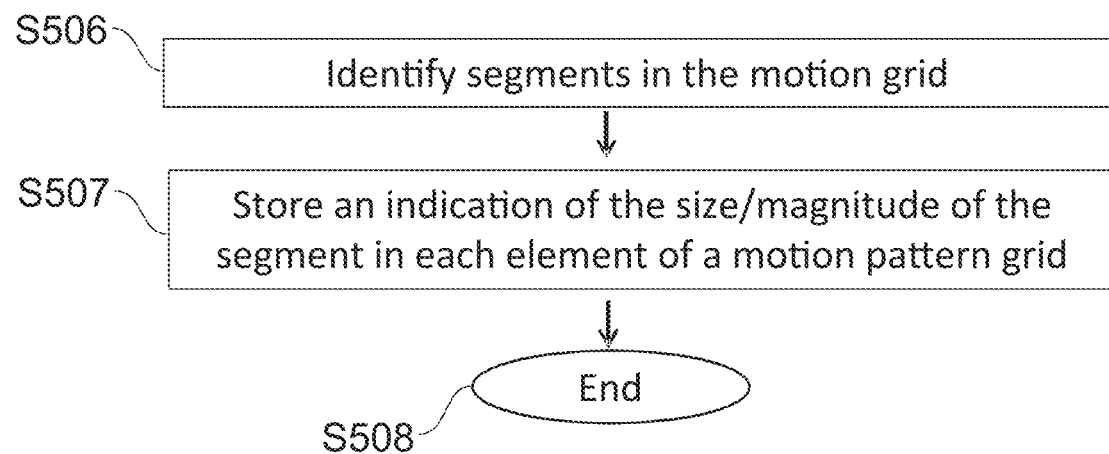
FIG. 5B is a flowchart illustrating a method for generating a motion pattern grid based on the motion grid.

FIG. 5B shows a flowchart of a method for generating a motion pattern grid 150 based on the motion grid 140. At step S506, possible segments are identified in the motion grid. A segment includes all elements on the motion grid in which a change ('1') is stored and which are connected to one another as neighbours. Neighbouring elements are elements that have a common edge or are diagonally adjacent to one another. At the next step S507, an indication of the size or magnitude of the segment to which the element belongs is stored in each element of the motion pattern grid. If the element does not belong to any segment, value 0 is stored in that element. The magnitude of a segment in the motion pattern grid is defined based on the number of elements it contains. Hence, the magnitude of a segment corresponds to the size of the segment measured by the number of elements. The magnitude of an element is the same as the magnitude of the segment it belongs to. The magnitude of an element in which no motion or change has been detected is 0. The method ends in step S508.

Figure 5C:
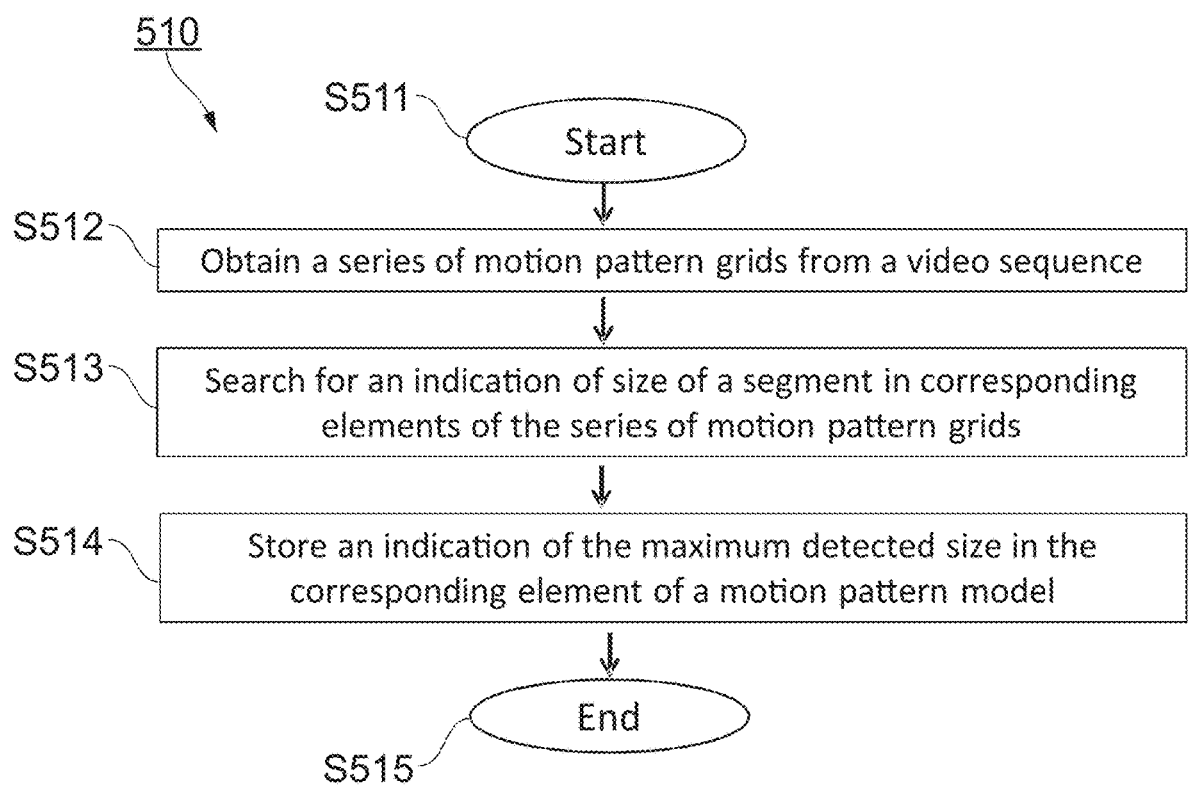
FIG. 5C is a flowchart illustrating a method for generating a motion pattern model.

Referring to the flowchart of FIG. 5C, a method for generating a motion pattern model is described. The method starts at step S511. First, a series of motion pattern grids is obtained from a video sequence to be modelled (S512). At step S513, all corresponding elements of the series of motion pattern grids are searched for an indication of size or magnitude. If an indication of magnitude is detected in any of the corresponding elements of the series of motion grids, an indication of the maximum detected magnitude in the series is stored in the corresponding element of the motion pattern model (S514). The method ends at step S515.

Figure 5D:
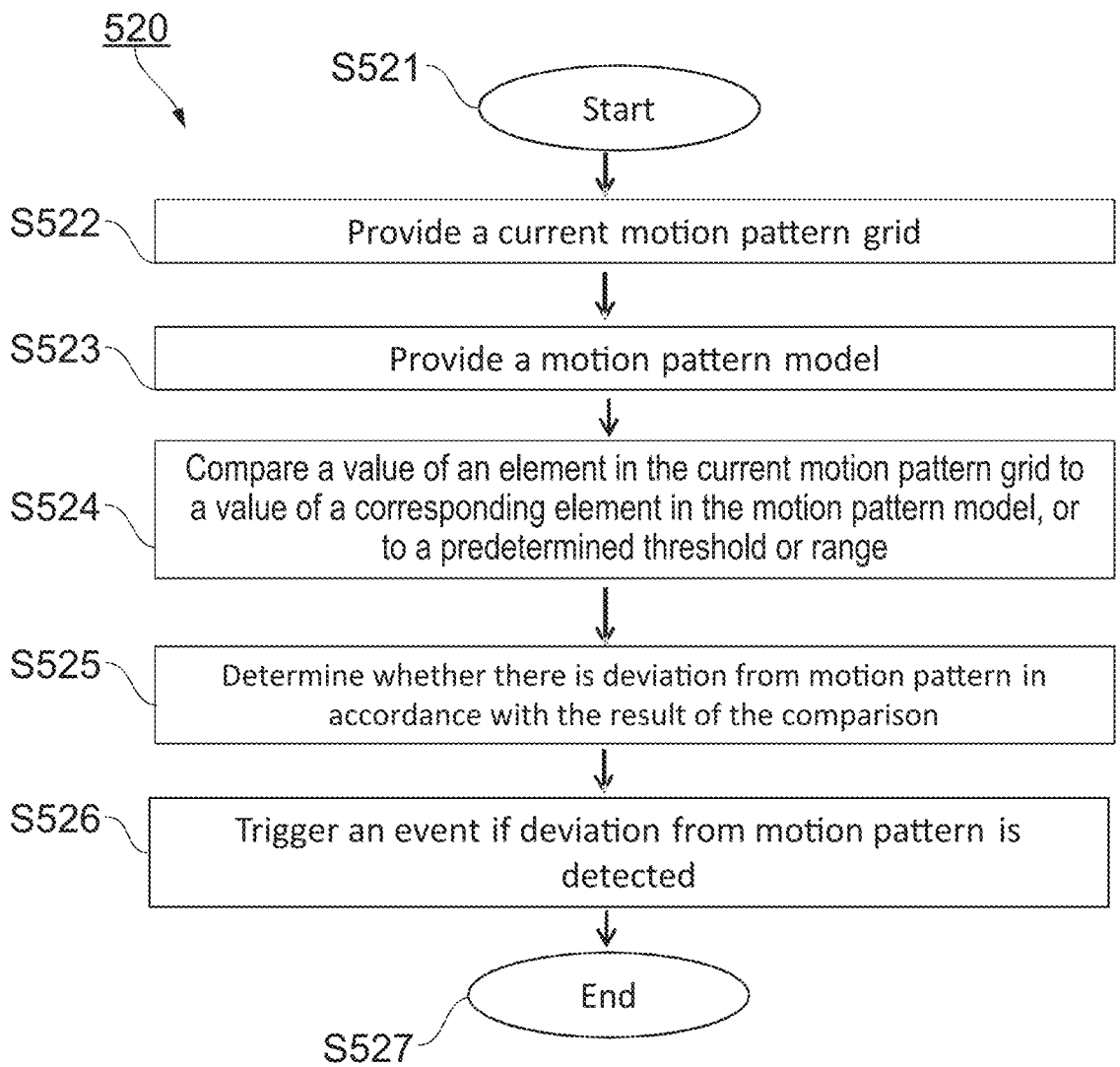
FIG. 5D is a flowchart illustrating a method for detecting deviation from a motion pattern in a video scene.

FIG. 5D illustrates a method flowchart for detecting deviation from the motion pattern in a video scene according to some embodiments of the present invention. The method starts at step S521. First, at step S522, a current motion pattern grid is provided. The current motion pattern grid can be generated by comparing two images to each other which are captured from a live video feed comprising a sequence of images, as described above with reference to FIGS. 5A and 5B. Alternatively, the motion pattern grid can be pre-stored in a memory, e.g. together with the video data. The current motion pattern grid includes a plurality of elements. In each element of the current motion pattern grid, an indication of magnitude of a segment is stored if there has been a change between the corresponding elements of the two captured images of the video sequence, as previously described.

Next, at step S523, a motion pattern model is provided. The motion pattern model may be for example a grid-form presentation of expected motion behaviour based on history data obtained from a video sequence of the scene. The motion pattern model has been generated by storing a maximum magnitude detected in each corresponding element of a series of motion pattern grids obtained from the video sequence, as described above. In some embodiments, the motion pattern model is not based on actual history data but is generated by storing a predetermined threshold value or a range of values in each element.

At the next step S524, the current motion pattern grid is compared to the motion pattern model or to a predetermined threshold or range. The comparison may include comparing an element in a selected region of the current motion pattern grid to the corresponding element in the region of the motion pattern model, or to the predetermined threshold or range.

The comparison step S524 can be repeated with the other elements of the current motion pattern grid.

At S525, it is determined, based on the comparison, whether there is deviation from the motion pattern. There are several possible conditions based on which the determination can be made, for example, a) the value of the element in the region of the current motion pattern grid deviates from the value of the corresponding element in the corresponding region of the motion pattern model, b) the value exceeds the predetermined threshold, c) the value is lower than the predetermined threshold, d) the value is within or outside the predetermined range, and e) the difference to the predetermined threshold exceeds or is smaller than a certain value.

As a result of detecting a deviation from the motion pattern, an event can be triggered (S526). Whether the event is triggered or not may depend on whether the deviation fulfils certain criteria, for example whether it exceeds a certain threshold. For instance, a certain level of noise can be taken into account to reduce unnecessary alerts. The method ends at step S527.

The above described processing may be implemented in various hardware depending on the situation. Various hardware that can detect deviation from a motion pattern will now be described.

Figure 6:
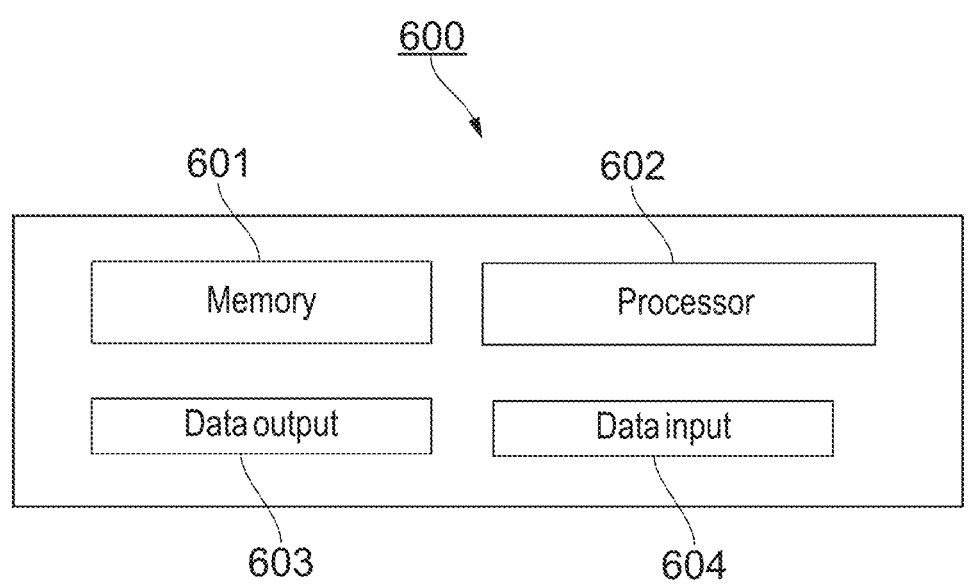
FIG. 6 is a simplified block diagram illustrating an apparatus according to some embodiments of the present invention.

FIG. 6 is a simplified block diagram illustrating a first apparatus 600 embodying the present invention. The apparatus 600 includes at least one processor 602 configured to process video sequences and motion pattern grid data according to the methods of the present invention. The apparatus 600 further includes at least one memory 601 configured to store video, motion pattern grid and motion pattern model data and computer program code for one or more programs (not shown).

The processor 602 is configured, with the computer program and memory 601, to generate a current motion pattern grid. The processor 602 is further configured to generate a motion pattern model from the video sequence, as previously described. The processor 602 is also configured to process pre-stored motion pattern grids and motion pattern models.

The processor 602 is further configured to perform comparison between the current motion pattern grid and the motion pattern model and to determine, based on the result of the comparison, whether there is deviation from a motion pattern, according to the previously described methods. The processor 602 is further configured to compare the element of the current motion pattern grid to a predetermined threshold value or range of values, according to the previously described methods. The computer programs executed by the processor 602 and memory 601 are configured to perform the previously described video sequence processing. Thus, the apparatus 600 is configured to detect deviation from the motion pattern by executing the methods of the present invention.

The apparatus 600 may further comprise a data input 604 configured to receive data, such as video data, and a data output 603 configured to output data, such as a notification that deviation from the motion pattern is detected. The data input 604 and data output 603 are configured to receive and send data to communicate with external devices. The apparatus 600 may also comprise a unit for wireless receiving and transmitting of data and for connecting the apparatus to a network such as WLAN, LTE or 5G network. Moreover, it may include an external memory unit, a sensor for detecting light and/or motion, a database for storing information, and one or more drivers. The apparatus may be a video surveillance camera. Alternatively, the apparatus may be a client terminal, server or a personal computer.

Figure 7:
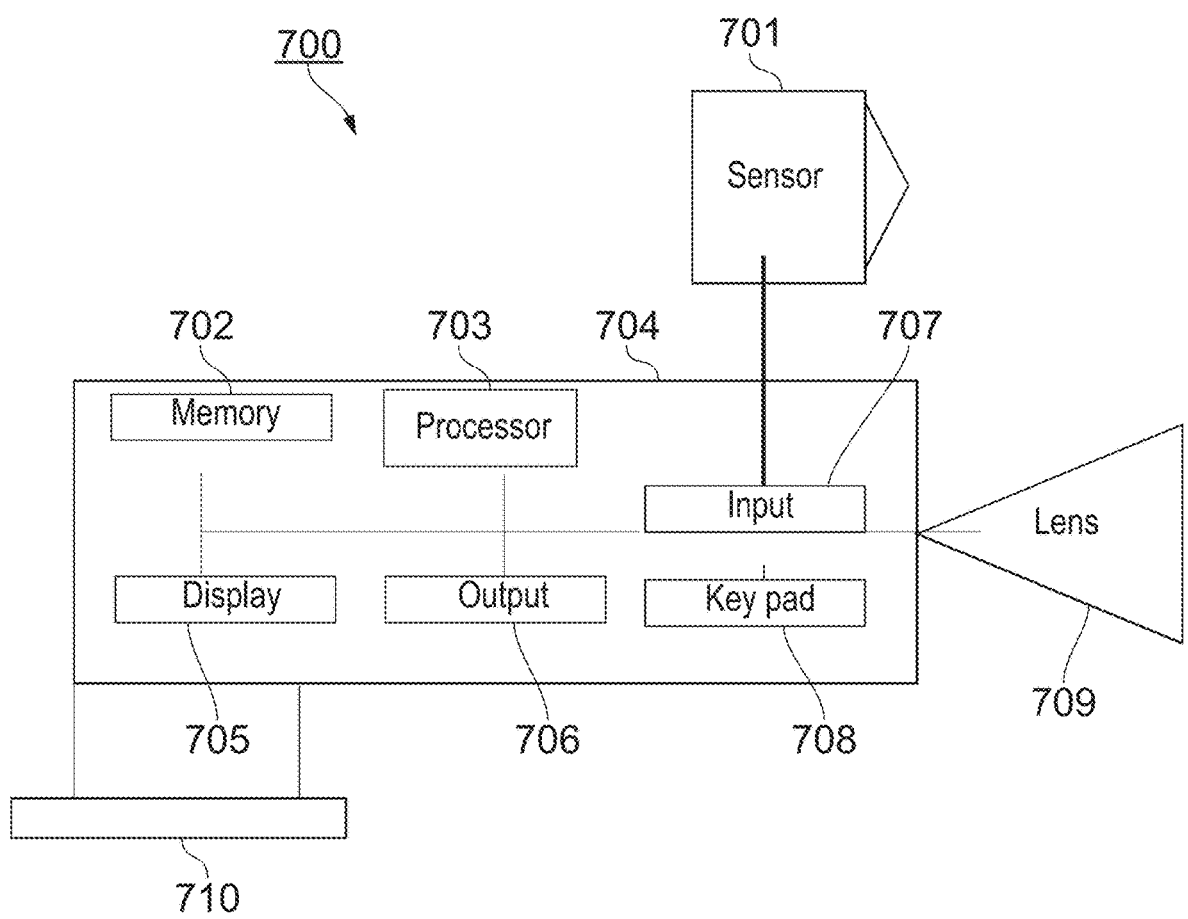
FIG. 7 is a simplified block diagram illustrating a video camera for implementing the method according to some embodiments of the present invention.

FIG. 7 is a simplified block diagram of a video surveillance camera 700 configured to perform the methods of the present invention.

According to some embodiments, the video surveillance camera 700 includes a lens 709 which is configured to capture a video and connected to at least one processor 703 and memory 702. The processor 703 is configured to process video sequences and motion pattern grid data according to the methods of the present invention. The memory 702 is configured to store video, motion pattern grid and motion pattern model data and computer program code for one or more programs. The processor 703 is configured to process the video captured by the lens 709 and to generate a motion pattern grid and a motion pattern model based on the video sequence. The memory 702 is configured to store the recorded video sequence and motion pattern grid data. The computer programs executed by the processor 703 and memory 702 may perform the previously described video sequence processing.

Additionally, the video camera 700 may comprise a housing 704, a data output 706 for outputting data such as a notification that deviation from the motion pattern is detected, a data input 707 for receiving data such as video data, and a key pad or a user interface 708. Optionally, the video camera 700 includes a sensor 701 for detecting light or movement and a display 705. It may further include a support element or fixing element 710 for installing the video camera to remain in a static position.

Figure 8:
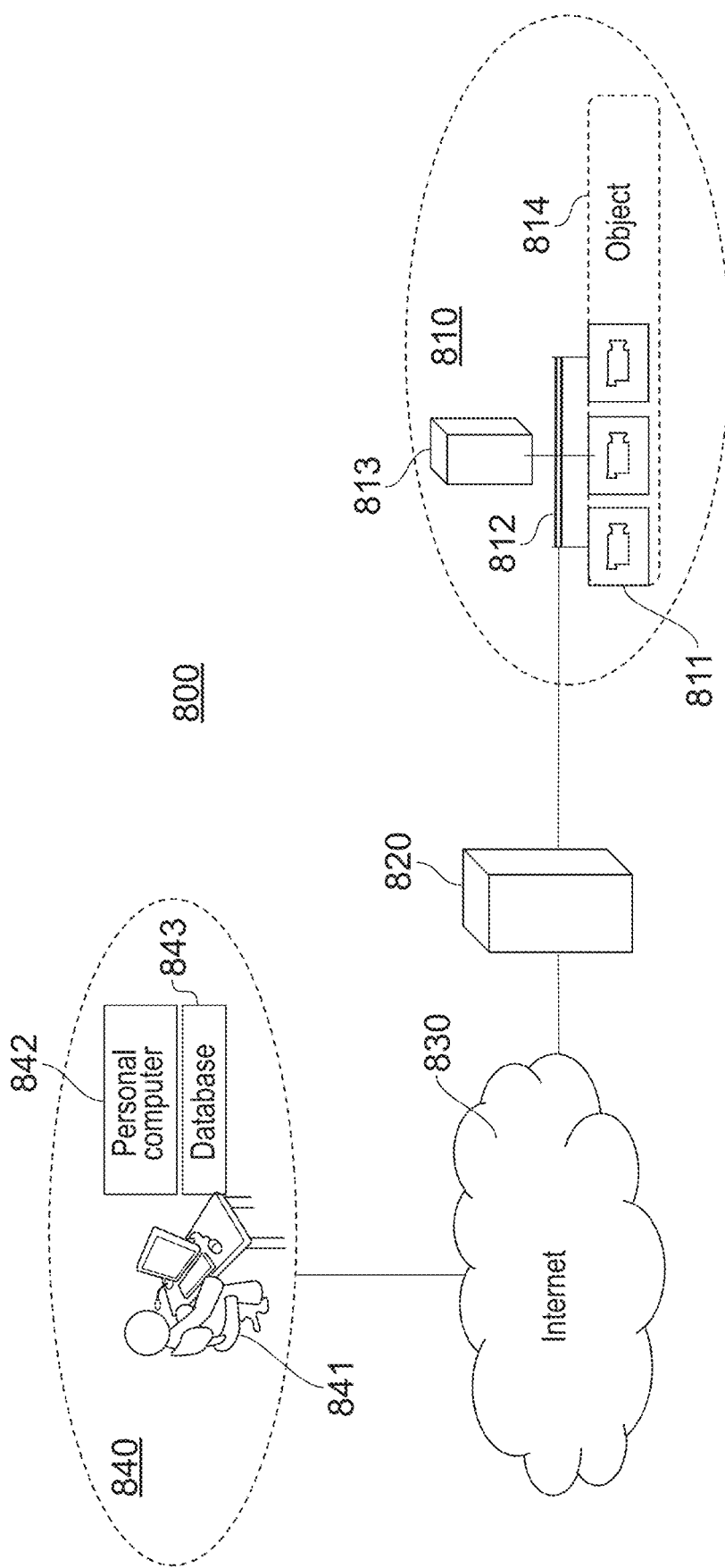
FIG. 8 is a simplified block diagram illustrating a system according to some embodiments of the present invention.

FIG. 8 is a simplified block diagram illustrating a system 800 according to some embodiments of the present invention. The system 800 includes an apparatus according to the present invention connected logically to other entities in the system as described below. The apparatus may be implemented in various entities of the system.

According to one embodiment of the present invention, the apparatus may be a video surveillance camera 811 installed at a remote site 810. The video surveillance camera 811 captures a video sequence of a scene, which is either processed by the video camera 811 or sent via a network or bus 812 to a server or computer 813, 820, 842 for processing. The video camera 811 may be connected to other video cameras via the bus 812, for example to provide full coverage of the monitored object 814. The video camera 811 may be additionally connected to one or more local computers 813 which comprise at least a processor and a memory (not shown) for processing and storing video data.

The video surveillance camera 811 is used for recording a video sequence to generate a motion pattern grid and a motion pattern model as previously described. The video surveillance camera may include all equipment, software and resources for analysing the video sequence and executing the methods of the present invention. The remote site 810 may be for example an industry site, a living property, rural area or a shop. The remote site may be connected to a management site 840 via a network 830.

According to another embodiment, the apparatus of the present invention may be implemented separately from the surveillance camera installation. For example, the apparatus may include or be integrated in a separate server 820, a cloud based server or a computer located at a management site 840. The apparatus is configured to execute the methods according to the present invention.

The management site 840 may comprise personal computers 842 configured to operate the surveillance camera installation and a database 843 configured to store motion pattern grid and video data. The personal computers 842 or servers at the management site may have greater processing capabilities and resources than what is available at the remote site 810. A person 841 using the personal computer 842 may receive a notification that deviation from the motion pattern has been detected and may react to it accordingly. The user may for example determine that the deviation belongs to normal motion behaviour and decide to include the deviation in the motion pattern model.

According to an embodiment, motion pattern grid data may be sent to the network 830 to be processed externally of the surveillance camera installation. The data may be processed for example at the management site 840 including one or more personal computers configured to operate the surveillance camera installation. The servers or personal computers may be configured to execute the methods according to the present invention.

Figure 9A:
FIG. 9A is a graphical representation of an image captured from a surveillance video sequence.

FIG. 9A is a graphical representation of a captured image showing a part of a highway where traffic is observed. The image may be obtained from a video sequence recorded by a video camera and is an example of the captured image used for generating the motion pattern grid and the motion pattern model.

Figure 9B:
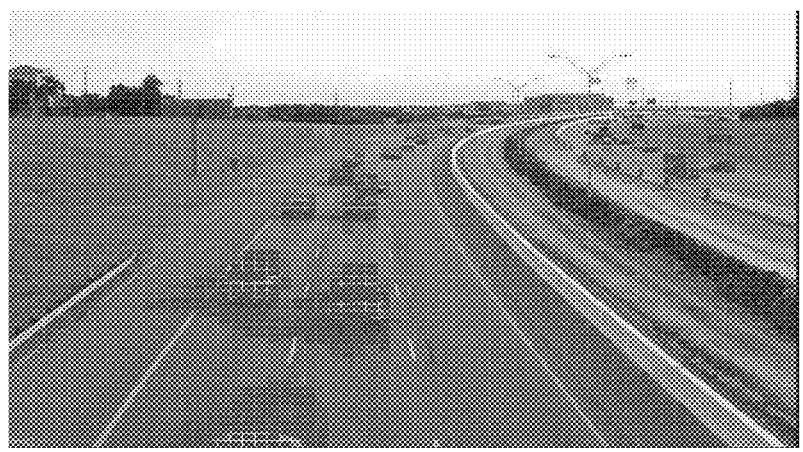
FIG. 9B is a graphical representation of the motion pattern grid as an overlay on the captured image.

FIG. 9B is a graphical representation of a motion grid as an overlay on the captured image of FIG. 9A. The image has been divided into a grid of elements. The elements in which a change has been detected between two captured images of the video sequence are shown as highlighted on the motion grid. Hence, the highlighted elements correspond to motion grid elements with a value of 'true' or '1' as described previously in connection with FIG. 1A and FIG. 1B.

Figure 9C:
FIG. 9C is a graphical representation of a motion pattern.

FIG. 9C shows an example of a motion pattern grid based on a captured video. The highlighted area represents the area where a moving object has been detected. In the image of FIG. 9C, the moving object is a human, so his real size does not vary in the video. However, the object occupies areas of different sizes on the motion pattern grid depending on its position and distance to the video camera. Generally, the size of the highlighted area on the motion pattern grid may also be an indication of the size of the object. In terms of the motion pattern grid, the size or intensity of the highlighted area indicates the magnitude of the segment, i.e. the number of elements in which motion has been detected. The magnitude can be also indicated in another way, such as by an integer. To show the occurrences of the detected magnitudes, also a frequency distribution can be used.

Furthermore, the size or distance of the object may be indicated using different intensity levels of the highlighted area. In FIG. 9C, the closer the object is to the video camera, the lighter the highlighted area is. Thus, in the motion pattern grid, intensity of the colour can be an indication of the magnitude of the segment or an element, i.e. the number of elements in the segment in which motion has been detected.

Based on the comparison between the motion pattern grid and the motion pattern model, it can be detected whether there are objects of unexpected size or objects located at unexpected distance to the video camera. The motion pattern grid can be analysed also by comparing it to a predetermined threshold or range instead of the motion pattern model. In this case, an event can be triggered if an object is detected whose size, shape and/or location are not expected based on the result of the comparison.

The present invention can be used especially for, but is not limited to, surveillance systems such as city surveillance, mobile surveillance systems, transportation installations, and from small or medium-sized installations to high-security installations. The use of the present invention is not limited to video surveillance but it can be used also for other imaging applications.

The above examples can be realised by a computer, a central processing unit (CPU) or a micro processing unit (MPU) of a system or apparatus that reads out and executes a program recorded on a memory device to perform the functions of the above-described embodiments. The above examples can also be realised by a method, the steps of which are performed by the computer of the system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium such as a non-transitory computer-readable medium).

The computer may comprise one or more of a central processing unit, micro processing unit, or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The present invention can be implemented in various forms without departing from the principal features of the present invention.

What is claimed is:

1. A method for detecting deviation from a motion pattern in a video, comprising:
   generating a current motion grid comprising a plurality of elements by storing in each element of the current motion grid an indication of whether there is a change between corresponding elements of at least two images of a video sequence;
   generating a current motion pattern grid by searching for a segment consisting of a plurality of elements in which a change has been indicated in the current motion grid and which are neighbouring to one another and, storing in each element of the segment a value corresponding to a size of the segment;
   comparing a value of an element of the current motion pattern grid with a value of the corresponding element of a motion pattern model, wherein the motion pattern model is generated by obtaining a series of motion pattern grids and storing in each element of the motion pattern model a value based on accumulated information from the series of motion pattern grids;
   determining whether there is deviation from the motion pattern model in accordance with the result of the comparison; and
   triggering an event when it is determined that there is deviation from the motion pattern model.

2. The method of claim 1, wherein the threshold value is part of the motion pattern model, and wherein the motion pattern model comprises a grid having the same dimensions as the current motion pattern grid.

3. The method of claim 2, wherein the motion pattern model comprises a minimum and a maximum threshold value for each element and the determining whether there is deviation from the motion pattern model comprises determining whether the value of the element of the current motion pattern grid is between the minimum and the maximum threshold value.

4. The method of claim 2, wherein the images used for generating the motion pattern model appear earlier in the video sequence than the images used for generating the current motion pattern grid.

5. The method of claim 1, wherein the threshold value is a minimum value and the determining whether there is deviation from the motion pattern model comprises determining whether the value of the element of the current motion pattern grid is lower than the minimum value.

6. The method of claim 1, wherein the threshold value is a maximum value and the determining whether there is deviation from the motion pattern model comprises determining whether the value of the element of the current motion pattern grid is higher than the maximum value.

7. The method of claim 1, wherein the value stored in an element of the motion pattern model is a minimum value detected in the corresponding elements of the series of motion pattern grids.

8. The method of claim 1, wherein the value stored in an element of the motion pattern model is a maximum value detected in the corresponding elements of the series of motion pattern grids.

9. The method of claim 1, wherein the triggering the event comprises at least one of setting a flag, setting a value of a bit, raising an alarm, and outputting a notification.

10. The method of claim 1, wherein the triggering of the event comprises sending a notification to a user that deviation from the motion pattern model is detected.

11. The method of claim 1, further comprising incrementally updating the motion pattern model by adding motion pattern grids related to the video to the series of motion pattern grids.

12. The method of claim 1, wherein each of the captured images is divided into a grid comprising a plurality of elements, the grids having the same dimensions as the current motion pattern grid.

13. The method of claim 1, wherein storing the indication of whether there is a change between corresponding elements of the at least two captured images comprises determining whether there is at least a predetermined number of changed pixels between the corresponding elements.

14. The method of claim 1, wherein the indication stored in the element of the current motion grid is an integer and the initial value of each element is zero.

15. The method of claim 1, wherein the corresponding elements have the same location on each grid defined by a row and a column.

16. The method of claim 1, wherein the value corresponding to the size of the segment indicates the number of elements in which a change has been indicated in the current motion grid and which are neighbouring to one another either vertically, horizontally or diagonally.

17. The method of claim 1, wherein the current motion pattern grid is obtained from a live video sequence recorded by a static video camera.

18. The method of claim 1, wherein the series of motion pattern grids is obtained from motion grid metadata generated in advance and stored in a database.

19. The method of claim 1, wherein the current motion pattern grid comprises the same number of elements in the same dimensions as the current motion grid.

20. An apparatus for detecting deviation from a motion pattern in a video, comprising
at least one processor; and
at least one memory including computer program code;
wherein the at least one processor is configured to, with the computer program code, to cause the apparatus to
generate a current motion grid comprising a plurality of elements by storing in each element of the current motion grid an indication of whether there is a change between corresponding elements of at least two images of a video sequence;
generate a current motion pattern grid by searching for a segment consisting of a plurality of elements in which a change has been indicated in the current motion grid and which are neighbouring to one another and, storing in each element of the segment a value corresponding to a size of the segment;
compare a value of an element of the current motion pattern grid with a value of the corresponding element of a motion pattern model, wherein the motion pattern model is generated by obtaining a series of motion pattern grids and storing in each element of the motion pattern model a value based on accumulated information from the series of motion pattern grids;
determine whether there is deviation from the motion pattern model in accordance with the result of the comparison; and
trigger an event when it is determined that there is deviation from the motion pattern model.

21. A non-transitory computer readable storage medium tangibly encoded with a computer program executable by a processor to perform actions comprising the steps of a method for detecting deviation from a motion pattern in a video, the method comprising:
generating a current motion grid comprising a plurality of elements by storing in each element of the current motion grid an indication of whether there is a change between corresponding elements of at least two images of the video;
generating a current motion pattern grid by searching for a segment consisting of a plurality of elements in which a change has been indicated in the current motion grid and which are neighbouring to one another and, storing in each element of the segment a value corresponding to the size of the segment;
comparing a value of an element of the current motion pattern grid to a value of the corresponding element of a motion pattern model, wherein the motion pattern model is generated by obtaining a series of motion pattern grids and storing in each element of the motion pattern model a value based on accumulated information from the series of motion pattern grids;
determining whether there is deviation from the motion pattern model in accordance with the result of the comparison; and
triggering an event when it is determined that there is deviation from the motion pattern model.

* * * * *